UNITED STATES PATENT OFFICE.

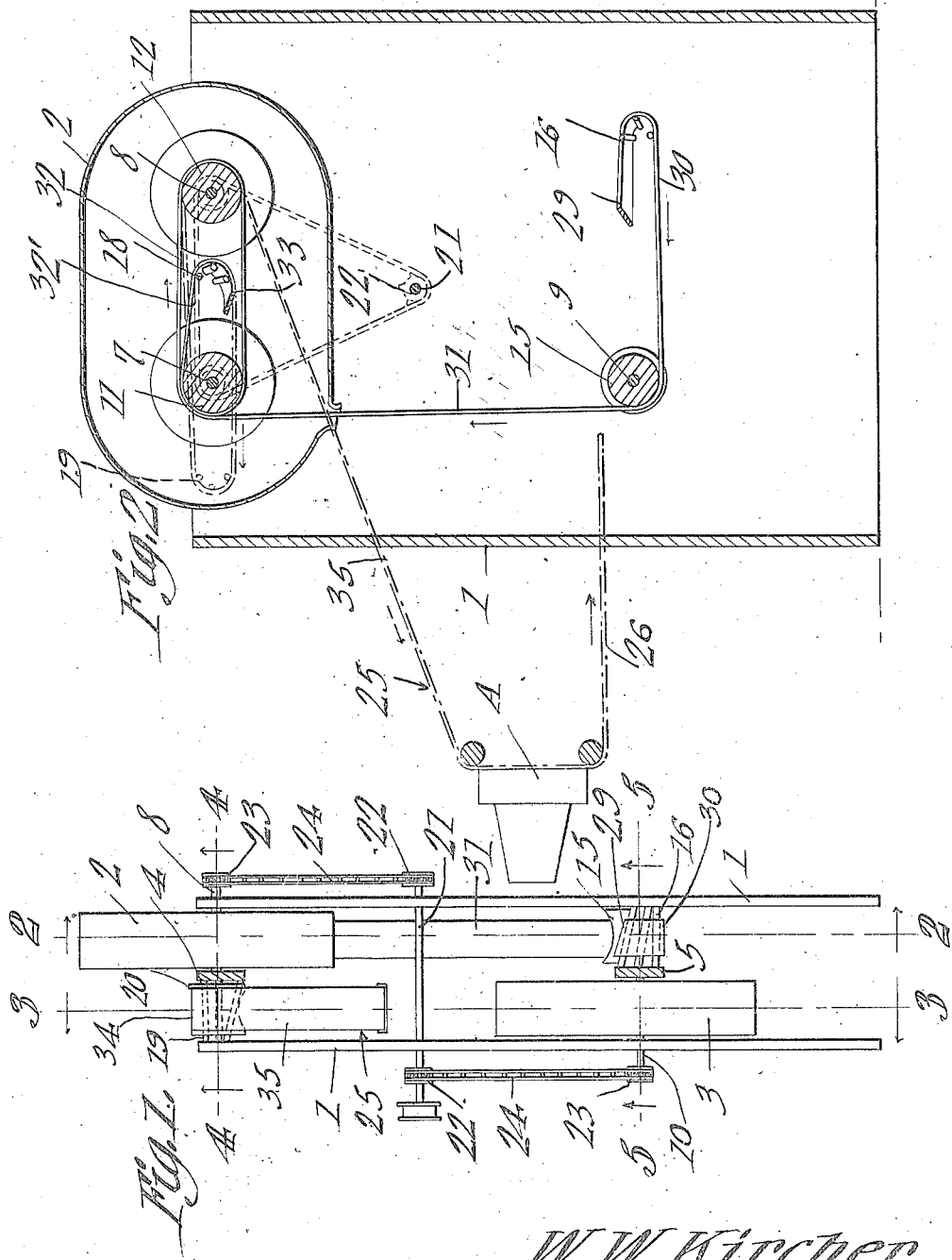

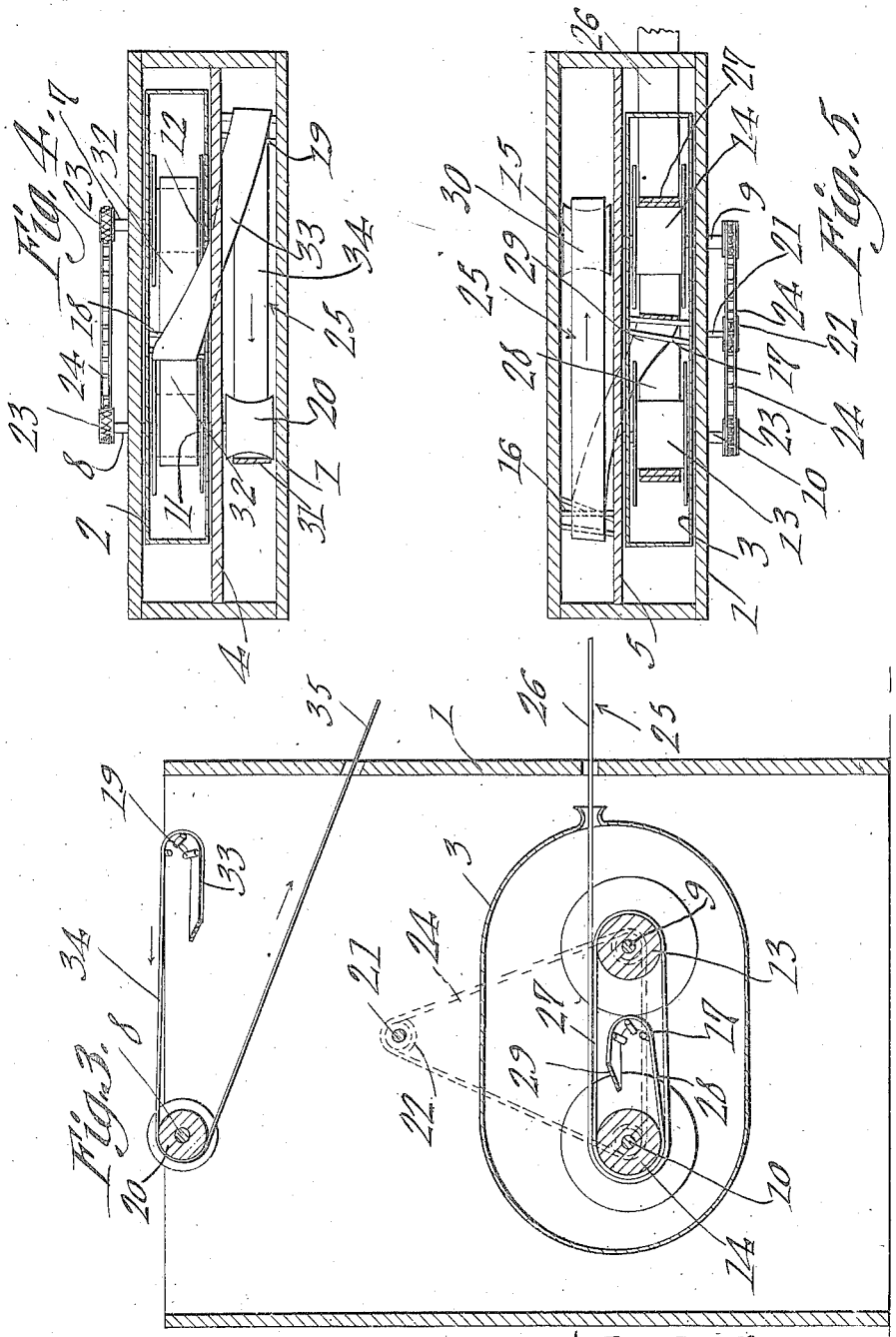

WILMER W. KIRCHER, OF PEORIA, ILLINOIS.

MOTION-PICTURE-FILM HOLDER.

1,207,298.

Specification of Letters Patent.

Patented Dec. 5, 1916.

Application filed June 23, 1915. Serial No. 35,918.

*To all whom it may concern:*

Be it known that I, WILMER W. KIRCHER, a citizen of the United States, residing at Peoria, in the county of Peoria and State of Illinois, have invented a new and useful Motion-Picture-Film Holder, of which the following is a specification.

The present invention appertains to motion picture film holders or reels, and aims to provide a novel and improved means for holding an endless film whereby the greater portion of the film is held in a compact manner by the holder, and in order that the film may travel in a circuitous path to and from the projecting apparatus of the motion picture machine, it being the object of the invention to eliminate the common practice of rewinding the film from one reel to another after the film has been drawn through the projecting apparatus.

It is also within the scope of the invention to provide a holder for an endless motion picture film, which is comparatively simple, compact and inexpensive in construction, which may hold a film of considerable length, which may be employed as a means for carrying or conveying the film from place to place so that the film may be readily applied to various motion picture machines, and which is convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a rear or edge elevation of the improved film holder, the rear wall of the frame being removed to expose the interior parts. Fig. 2 is a vertical section taken on the line 2—2 of Fig. 1, and illustrating in dot and dash lines certain portions of the film which are on the near side of the plane of section and which would otherwise not be seen in the said figure. Fig. 3 is another vertical section taken on the line 3—3 of Fig. 1. Figs. 4 and 5 are horizontal sections taken on the lines 4—4 and 5—5, respectively, of Fig. 1.

In carrying out the invention, there is provided a suitable frame 1, which has mounted therein upper and lower reel casings or housings 2 and 3, respectively. The casings 2 and 3 are arranged adjacent the opposite side walls of the frame 1, the upper casing 2 being supported between one side wall of the frame and a longitudinal rail or support 4 within the upper portion of the frame 1, while the lower casing 3 is supported between the opposite side wall of the frame and a lower longitudinal rail or support 5. The rails or supports 4 and 5 are disposed between the opposite side walls of the frame. A pair of parallel horizontal longitudinally-spaced shafts 7 and 8 are journaled through the sides of the casing 2 and are journaled through the rail 4 and respective side wall of the frame 1, the shaft 8 being extended through the opposite side wall of the frame. A pair of parallel horizontal longitudinally-spaced shafts 9 and 10 are journaled through the rail 5 and respective side wall of the frame, the shaft 9 being extended through the opposite side wall of the frame. The upper shafts 7 and 8 are disposed directly above the respective lower shafts 9 and 10, and reels 11, 12, 13 and 14 are secured upon the respective shafts 7, 8, 9 and 10 within the respective casings 2 and 3. The two pairs of reels 11—12 and 13—14 have parallel axes and are disposed in spaced parallel planes, to enable the film to be passed from one pair of reels to the other in the manner which will more fully appear hereinafter.

A pulley wheel or rotary guide 15 is journaled loosely upon the shaft 9 between the rail 5 and that side wall of the frame 1 opposite the casing 3, the pulley wheel 15 being located in vertical alinement with the upper reel 11. A set of rollers or guides 16 are mounted between the same rail and side wall of the frame as the pulley wheel 15, and are arranged below the upper reel 12, and a similar set of rollers or guides 17 are mounted within the casing 3 between the lower reels 13 and 14.

A set of rollers or guides 18 similar to the rollers 17 are mounted or supported within the casing 2 between the upper reels 11 and 12, and a set of rollers or guides 19 are supported between the rail 4 and that side wall of the frame opposite the casing 2. The rollers 19 are disposed above the lower reel 13, and a pulley wheel 20 is journaled loosely upon the shaft 8 at that side of the rail 4 opposite the casing 2. The pulley wheel 20 is located above the lower reel 14.

The reels 11, 12, 13 and 14 are preferably driven in order that the film will wind thereon and unwind therefrom properly without the necessity of the film being pulled under considerable tension from the reels, and to this end a driving shaft 21 is journaled through the side walls of the frame 1 between the upper and lower pairs of reels, and sprocket wheels 22 are secured upon the ends of the shaft 21. Sprocket wheels 23 are secured upon opposite ends of the upper and lower reel shafts, and sprocket chains 24 are passed around the respective sprocket wheels 22 and 23, whereby the reel shafts will be rotated when the driving shaft 21 is rotated. The shaft 21 may be rotated in any suitable manner, and may be belted or otherwise connected to the motion picture machine.

The endless film is designated generally by the numeral 25, and from the projecting apparatus A of the motion picture machine, the film 25 extends as at 26, over the lower reels 13 and 14, and is wound a number of times around said reels, as at 27. The inner convolution of the wound portion 27 extends from the reel 14 to and around the guide rollers 17, as at 28, and then extend diagonally, as at 29, to and around the guide rollers 16. From the guide rollers 16, the film extends, as at 30, to and around the pulley wheel 15, and thence extends upwardly, as at 31, to and over the upper reel 11. The film is then wound a number of times around the reels 11 and 12, as at 32, and the inner convolution of the wound portion 32 extends, as at 32', to and around the guide rollers 18. From the guide rollers 18, the film extends, as at 33, to and around the guide rollers 19, and from the guide rollers 19 the film extends to and around the pulley wheel 20, as at 34. From the pulley wheel 20 the film extends, as at 35, to the projecting apparatus A. It will therefore be obvious that the film extends through a complete circuit. The guide rollers 16 and 17 are so arranged, as to properly guide the oblique or diagonal run 29 of the film therebetween, and whereby the film will be led from between the lower reels 13 and 14 to the pulley wheel 15 from which the film extends to the upper reels. Similarly, the guide rollers 18 and 19 are so arranged as to properly guide the film from between the reels 11 and 12 to the pulley wheel 20. The rollers 17 provide means for guiding or turning the film to one side from between the reels 13 and 14, and similarly, the rollers 18 provide means for guiding or turning the film to one side from between the upper reels 11 and 12. The film may be wound any number of times upon the pairs of reels according to the length of the film, and a sufficient slack portion is allowed between the lower reels and the upper pulley wheel 20 to provide the runs 35 and 26 extending to and from the projectory apparatus A, respectively.

In operation, supposing the shaft 21 to be rotated for rotating the reels properly, the run 26 of the film which leaves the projectory apparatus A is wound upon the reels 13 and 14, as at 27, and at the same time, the film is unwound from the said reels since the inner convolution of the wound portion 27 is carried from the reel 14 to the guide rollers 17, as at 28. From the rollers 17 the film is guided to the rollers 16, and thence to the pulley wheel 15, from which the film passes upwardly, as at 31, and is wound upon the upper reels in approximately the same manner as the film is wound upon the lower reels. During the time that the film is being wound upon the upper reels, it is also unwound therefrom, since the inner convolution of the wound portion 32 is carried from the reel 11 to the guide rollers 18, and thence to the guide rollers 19 and pulley wheel 20 in succession. From the pulley wheel 20 the film extends, as at 35, to the projecting apparatus. When the film has been completely run through the projecting apparatus, the film will be returned to initial position, and is ready to be again started through the projecting apparatus. When a number of films are employed, they may be carried by independent holders and one holder may be readily replaced by another, since the slack or loop portion of the film may be readily applied to and removed from the motion picture machine.

The advantages of the present device will suggest themselves to those skilled in the art, it being noted that the present invention eliminates the necessity of rewinding the film from one reel to another according to prevailing practice, and which assumes considerable time and trouble. Due to the provision of the two pairs of reels, the capacity of the present holder is increased, since each pair of reels may hold a considerable portion of film, and furthermore, each pair of reels in being separated will accommodate a considerable length of film. This will eliminate the necessity of there being too many convolutions of film around one reel, and which would cause the outer and inner convolutions to travel at such widely varied velocities, as to impair the operation of the device. The use of one reel, therefore, for simultaneously winding the film thereon and unwinding the film therefrom is objectionable, since the film would be wound upon and unwound from the reel at greatly varied velocities, whereas with the present appliance the film is wound upon and unwound from the reels with but comparatively little variation in speed.

Although the film has been described and marked by arrows in the drawings, as moving in one direction, it will be apparent that the film may be moved in the opposite direction with equal success and propriety, since the operation will merely be reversed.

It is also manifest that the frame and casings are provided with suitable slots or openings for the passage of the film therethrough.

The device may also be used with an ordinary film, the ends of which are detached. Thus, instead of extending the film as at 28—29—30—31, the portion 28 is fastened by a suitable clip or clasp to the inner run of the portion 27, so that when the film passes downwardly, it will be unwound from the upper reels 11 and 12, and wound upon the lower reels 13 and 14. When the upper reels are emptied, the reels may be reversed, the filled reels being disposed at the top and the empty reels being disposed below. The portion 28 is then loosened and extended as at 29 and 30 and is then passed through the apparatus A, and thence to the reels 11 and 12 in the same manner as above illustrated and described. This, however, necessitates the threading of the film from the reels upon which the film is wound, to the apparatus A and thence to the empty reels.

Having thus described the invention, what is claimed as new is:—

A motion picture film holder comprising upper and lower pairs of reels arranged in spaced vertical planes; a film having upper and lower windings upon the upper and lower pairs of reels, respectively; means for guiding the film from the interior of the upper winding out between the upper reels into the vertical plane of the lower reels, then to a projecting apparatus and then to the lower winding; and means for guiding the film from the interior of the lower winding out between the lower reels into the vertical plane of the upper reels and thence to the upper winding.

In testimony that I claim the foregoing as my own I have hereto affixed my signature in the presence of two witnesses.

WILMER W. KIRCHER.

Witnesses:
ERNEST G. FULLER,
W. A. MCNAIR.